United States Patent [19]
Alexander

[11] 4,031,622
[45] June 28, 1977

[54] PORTABLE POWER DRIVEN IMPLEMENT
[75] Inventor: Carl J. Alexander, Moore Park, Mich.
[73] Assignee: Wells Manufacturing Corporation, Three Rivers, Mich.
[22] Filed: Oct. 28, 1975
[21] Appl. No.: 626,296
[52] U.S. Cl. ............................ 30/392; 30/219; 56/328 TS
[51] Int. Cl.² ................ B27B 19/04; A01D 46/00
[58] Field of Search ............ 30/272 R, 392, 393, 30/394, 220, 216, 219; 74/52; 56/328 TS

[56] References Cited
UNITED STATES PATENTS

| 2,268,221 | 12/1941 | Mischker | 30/216 |
| 2,480,957 | 9/1949 | Phelps | 30/392 |
| 2,659,969 | 11/1953 | Merkur | 30/216 |
| 3,924,390 | 12/1975 | Alexander | 56/328 TS |

FOREIGN PATENTS OR APPLICATIONS 217,527  10/1958  Australia ..................... 30/392

Primary Examiner—Al Lawrence Smith
Assistant Examiner—J. C. Peters
Attorney, Agent, or Firm—Dressler, Goldsmith, Clement, Gordon & Shore, Ltd.

[57] ABSTRACT

A portable power driven implement having a motor as a power source and a drive train which is compact and the components of which are readily accessible, in which the motor rotates drive means which is connected to rotate output means, and in which a linking member connected to the rotating output means imparts reciprocating motion to a tool member, the linking member spanning the drive means and configured to avoid interfering engagement therewith.

23 Claims, 6 Drawing Figures

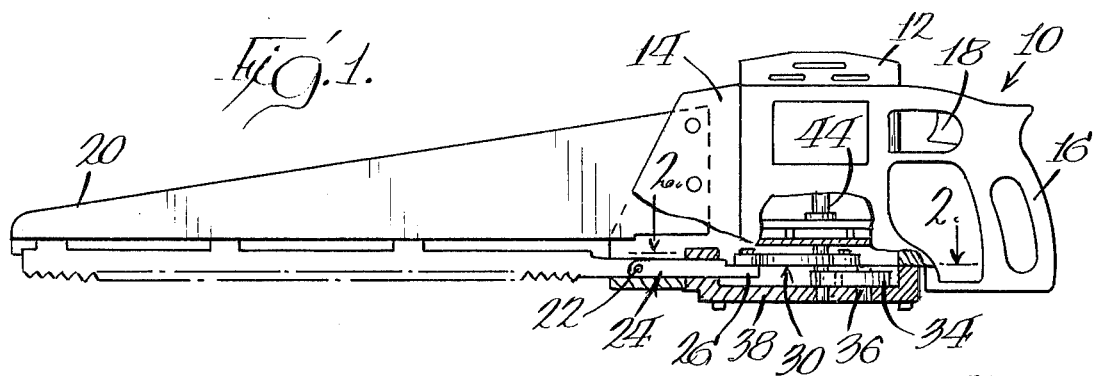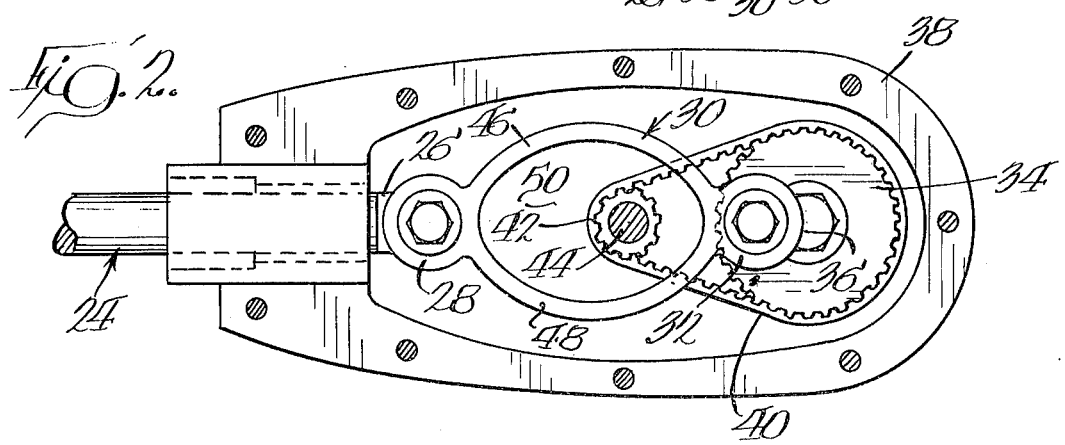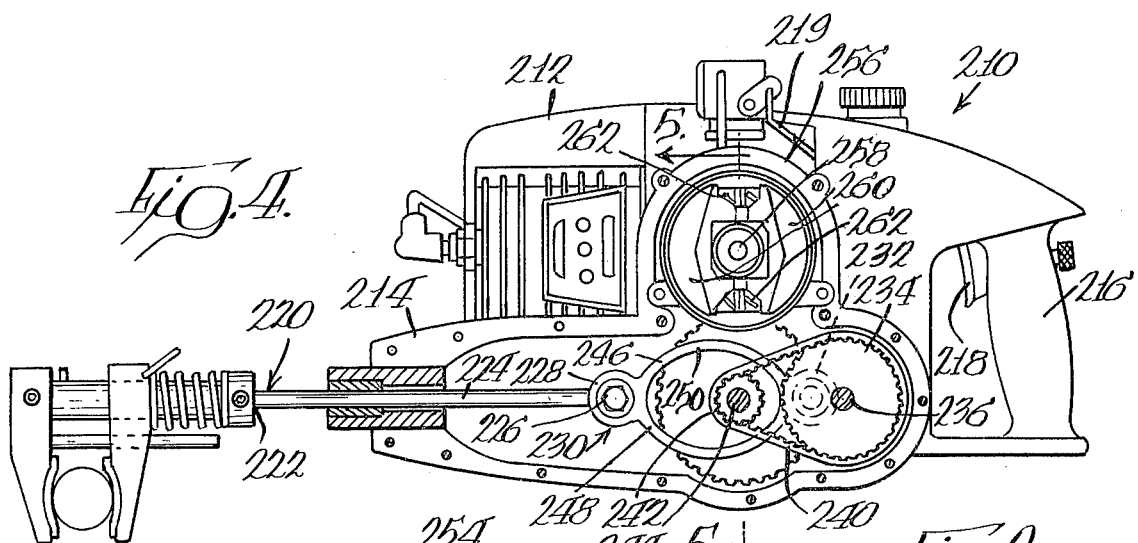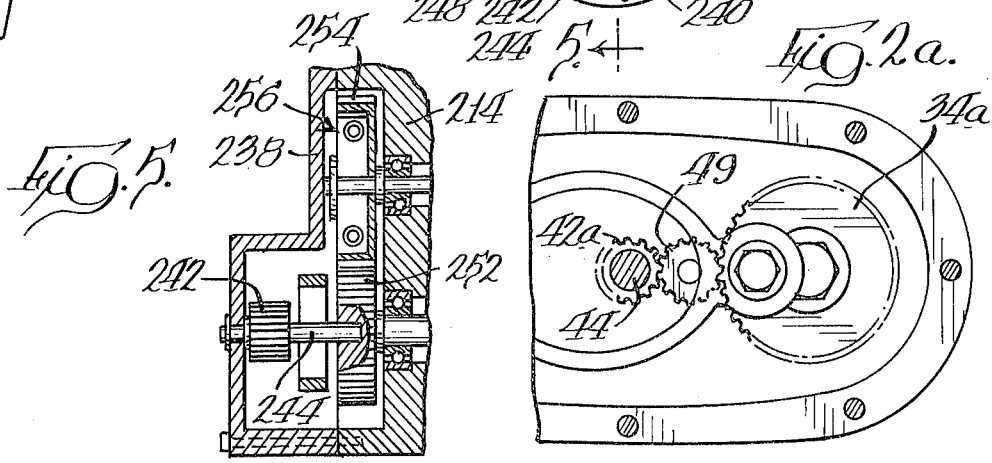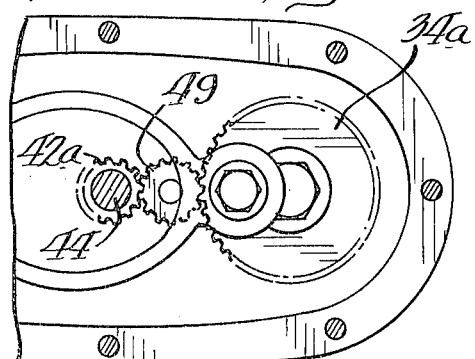

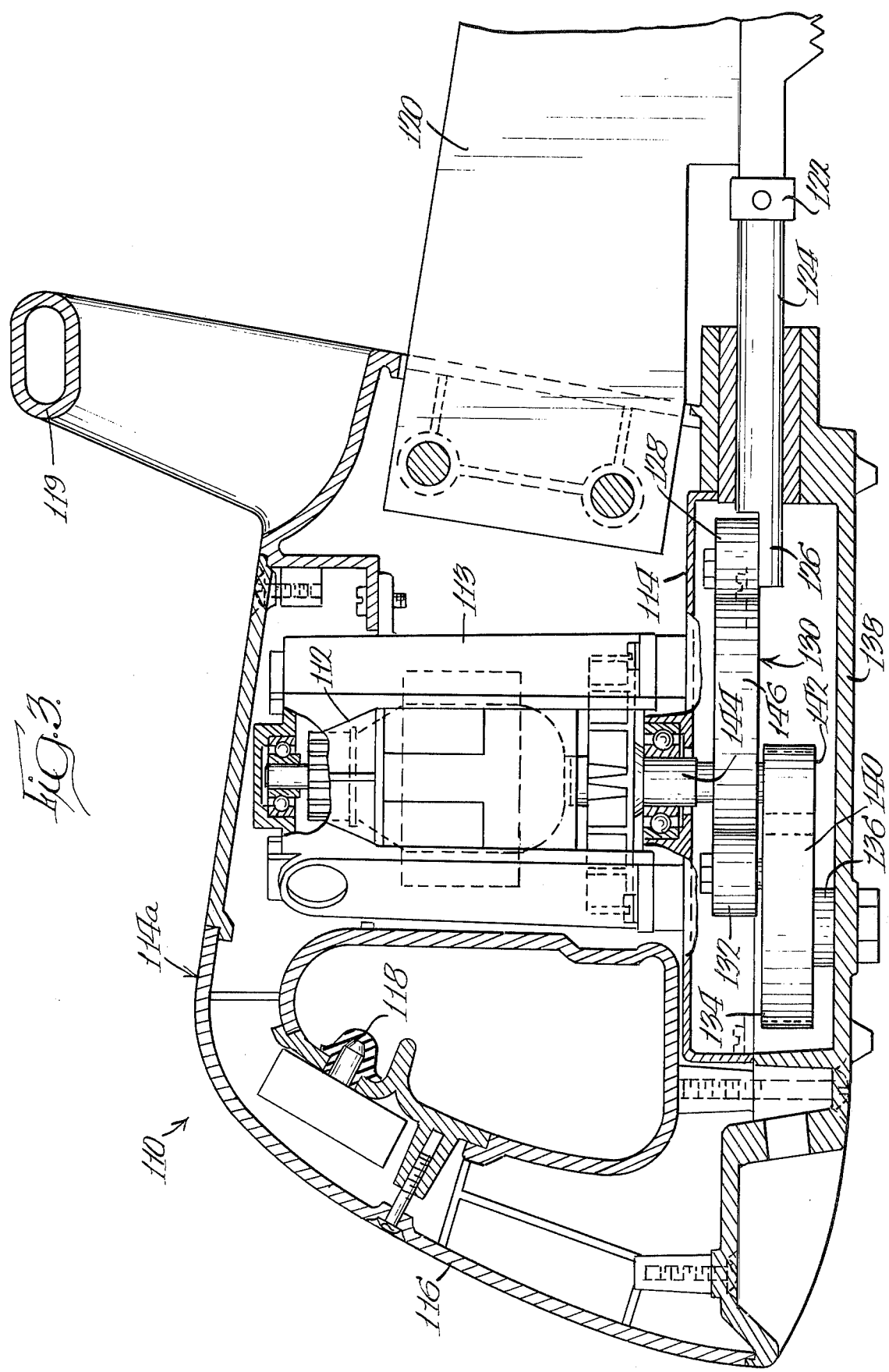

PORTABLE POWER DRIVEN IMPLEMENT

BACKGROUND OF THE INVENTION

The present invention relates to portable power driven implements of the type utilizing reciprocating tools for performing a work function.

Examples of such reciprocating tools are the portable power driven saws such as are disclosed in U.S. Pat. Nos. 2,784,751 and 3,716,916, and reciprocably driven harvesting implements such as those shown in U.S. Pat. No. 3,174,269 and in my co-pending application Ser. No. 477,432, filed June 7, 1974, now U.S. Pat. No. 3,924,390.

While such portable power driven implements are satisfactory, it would be desirable to make such implements as compact as possible while simultaneously providing ready and convenient access to the various components for service.

SUMMARY OF THE INVENTION

In accordance with the present invention there is provided a portable power driven implement of the type having a reciprocating tool which is compact and in which the operating components are readily accessible.

A portable power driven implement incorporating the present invention includes a motor providing power, such as a light weight internal combustion engine or an electric motor, and a power train for imparting the desired reciprocating motion to the tool, and, when desired, for reducing the frequency of oscillation of the reciprocating tool.

The power train for such a portable power driven implement incorporates drive means connected to be rotated by the motor and an output means connected to the drive means and rotated thereby. A linking member connects the rotating output means to a reciprocating tool member and includes end portions connected respectively to the inner portion of the tool member and to the rotating output means and an intermediate portion spanning the rotating drive means and configured to avoid engagement and interference therewith even though the one end of the linking member traverses a plane defined by the axis of the drive means and the inner end of the reciprocating tool member.

More specifically, the power source, whether an electric motor or an internal combustion engine, is suitably connected to drive gear means disposed on a drive shaft which, in turn, is drivingly connected to output gear means affixed to a rotatable output shaft. The linking member is disposed between the drive gear means and the output gear means on one hand and the motor on the other to produce a compact configuration with the intermediate portion of the linking member formed as a pair of arcuate legs defining a central elongate opening through which the drive shaft passes. In this way, the lateral and longitudinal dimensions of the drive train are minimized and the drive components are accessible to service.

Numerous other advantages and features of the present invention will become readily apparent from the following detailed description of the invention and of one embodiment thereof, from the claims and from the accompanying drawing in which each and every detail shown is fully and completely disclosed as a part of this specification in which like numerals refer to like parts.

BRIEF DESCRIPTION OF THE DRAWING

FIG. 1 is a side elevational view of the portable power driven implement embodying the present invention;

FIG. 2 is a sectional view along lines 2—2 of FIG. 1;

FIG. 2(a) is a view similar to FIG. 2 showing an alternative embodiment of the portion of the drive train;

FIG. 3 is a side view partially in section of an alternative embodiment of the portable power driven implement of FIGS. 1 and 2;

FIG. 4 is a side elevational view, partially broken away, of yet another embodiment of the portable power driven implement incorporating the present invention; and FIG. 5 is a sectional view taken along 5—5 of FIG. 4.

DESCRIPTION OF PREFERRED EMBODIMENTS

While this invention is susceptible of embodiment in many different forms, there is shown in the drawings and will herein be described in detail a preferred embodiment of the invention and modifications thereof, with the understanding that the present disclosure is to be considered as an exemplification of the principles of the invention and is not intended to limit the invention to the embodiments illustrated. The scope of the invention will be pointed out in the appended claims.

FIGS. 1 and 2 disclose one embodiment of a portable power driven implement 10 incorporating the present invention. In the embodiment of FIGS. 1 and 2, the implement 10 includes a motor 12, shown as an electric motor, situated in a housing 14. The housing 14 includes a pistol grip 16 and a trigger 18 for controlling operation of the motor 12.

The motor 12 is adapted to drive a tool 20 shown in FIG. 1 as a saw blade, affixed to the outer end 22 of a tool member 24 which is slidably supported for reciprocating movement in the housing 14 with its inner end 26 disposed within the housing 14.

The inner end 26 of the tool member 24 is pivotally connected to one end 28 of a linking member 30, the other end 32 of which is connected to output gear means 34, shown in FIGS. 1 and 2 as a sprocket wheel, at a point eccentric from the axis of rotation defined by the output shaft 36 suitably journalled in a cover plate 38 affixed to the housing 14. The output sprocket 34 is rotated by means of a drive chain 40 extending around drive gear means 42, shown as a sprocket wheel in FIGS. 1 and 2, suitably affixed to a drive shaft 44. In FIGS. 1 and 2, the drive shaft 44 is the motor shaft, and is suitably journalled in the housing 14 as well as in the cover plate 38.

As seen most clearly in FIG. 2, the linking member 30 includes, in addition to the end portions 28, 32, an intermediate portion defined by a pair of arcuate legs 46, 48 extending between the end portions 28, 32. The arcuate legs 46, 48 define a central elongate aperture 50 therebetween. The drive shaft 44 extends through the aperture 50 with the linking member 30 disposed between the motor 12 on one hand and both the output sprocket 34 and the drive sprocket 42 on the other. The degree of curvature of the arcuate legs 46, 48 is such as to permit the movement of the end portion 32 connected to the output sprocket 34 to repetitively intersect and traverse a plane defined by the axis of the drive shaft 44 and the inner end 26 of the tool member 24 while a substantial portion of the arcuate legs 46, 48 remain on one side of the plane and, therefore, do not engage and interfere with the drive shaft 44.

The respective diameters of the drive sprocket 42 and the output sprocket 34 are selected to provide desired speed reduction thereby allowing the motor 12 to rotate at its most efficient speed while limiting the reciprocating frequency of the tool member 18 to that appropriate to the tool to which it is connected.

The chain drive of FIGS. 1 and 2 is illustrative of one embodiment for rotating an output member such as sprocket 34 to effect reciprocating motion of the tool member 18 and a tool connected thereto. The drive chain 40 being a flexible interconnection is advantageous in that it minimizes the transmission of vibrations from the tool to the motor. If desired, however, a direct connection can be utilized such as is shown in FIG. 2(a). In FIG. 2(a) the drive sprocket wheel has been replaced by a drive gear 42a affixed to the drive shaft 44; and the output sprocket 34 has been replaced by an output gear 34a. The teeth of the gears 34a and 42a are either directly engaged or are connected as shown through a middle gear 49 to effect rotation of the output gear 34a in response to rotation of the drive gear 42a.

The embodiment of FIG. 3 is functionally substantially the same as the embodiment shown in FIGS. 1 and 2. The FIG. 3 embodiment illustrates how an implement 110 can be designed to take advantage of the arrangement of the various components to provide ready access to each for servicing or replacement if necessary.

The implement 110 shown in FIG. 3 includes an electric motor 112 suitably supported in a motor housing 113. The motor housing 113 is bolted or otherwise suitably affixed to a main housing 114. A two piece auxiliary housing 114a defines a pistol grip 116 which incorporates a trigger 118 for controlling operation of the motor 112, and an auxiliary handle 119 to facilitate holding and manipulation of the implement 110. The auxiliary housing 114a is suitably bolted or otherwise affixed to the main housing 114.

As in the case of the embodiment of FIGS. 1 and 2, the motor 112 is adapted to drive a tool 120 shown as a saw blade which is affixed to the outer end 122 of a tool member 124 which is slidably supported for reciprocating movement in the housing 114 with its inner end 126 disposed within the housing 114.

The inner end 126 of the tool member 124 is pivotally connected to one end 128 of a linking member 130 the other end 132 of which is connected to an output sprocket 134 at a point eccentric to the axis of rotation defined by an output shaft 136 suitably journalled in a cover plate 138 affixed to the housing 114. The output sprocket 134 is rotated by means of a drive chain 140 extending around a drive sprocket 142 affixed to a drive shaft 144 which in the disclosed embodiment corresponds to the motor shaft. The drive shaft 144 is suitably journalled in the main housing 114 and in the motor housing 113.

The linking member 130 is substantially identical to the linking member shown in FIGS. 1 and 2 and includes in addition to the end portions 128, 132 an intermediate portion defined by a pair of arcuate legs, only leg 146 being shown. The arcuate legs are configured substantially the same as the legs in FIGS. 1 and 2 and function accordingly.

In the embodiment of FIG. 3, access can be obtained to the components of the drive system simply by removal of the cover plate 138 while access can be had to the motor 112 by removal of the motor housing 113.

In the alternative embodiment shown in FIGS. 4 and 5, the implement 210 incorporating the present invention includes an internal combustion engine 212, which can be a conventional, air cooled two-cycle or four-cycle gasoline engine situated in a housing 214. The housing 214 includes a pistol grip 216 and a trigger 218 which controls throttling of engine 212 by means of throttle linkage 219. The engine 212 is adapted to drive a tool 220, such as a spring-biased vibratory clamp means mounted on the outer end 222 of a tool member 224 slidably supported in the housing 214. The vibratory clamp member is described in more detail in my co-pending application Ser. No. 477,432, filed June 7, 1974, now U.S. Pat. No. 3,924,390, incorporated herein by reference.

The inner end 226 of the tool member 224 is pivotally connected to one end 228 of a linking member 230, the other end 232 of which is pivotally connected to an output sprocket 234 at a point eccentric from the axis of rotation defined by an output shaft 236 suitably journalled in a cover plate 238 affixed to the housing 214. The output sprocket 234 is rotated by means of a drive chain 240 extending around a drive sprocket 242 affixed to a drive shaft 244 suitably journalled in both the housing 214 and the cover plate 238. The intermediate portion of the linking member 230 is defined by a pair of arcuate legs 246, 248 which define a central elongate aperture 250 therebetween. The drive shaft 244 extends through the aperture 250 with the linking member 230 disposed between the output sprocket 234 at the drive sprocket 242 on one end and an intermediate drive gear 252 on the other. The intermediate drive gear 252 is affixed to the drive shaft 244. The teeth of the drive gear 252 directly engage teeth formed on an outer surface 254 of a centrifugal clutch 256 which is journalled to engine shaft 258.

Rotatably outwardly moveable shoes 260 forming part of the centrifugal clutch 256 are fixed to the engine shaft 258 and are adapted to be pressed against and engage the clutch drum 254 as the angular velocity of the shaft 258 reaches a predetermined value. A pair of springs 262 determine the angular velocity at which the shoes 260 engage the outer drum 254 and also serve to return the shoes 260 to a rest position as the angular velocity of the engine shaft 258 decreases below a preselected value.

When the shoes 260 engage the outer drum 254 of the clutch 256, the drum is rotated to drive the intermediate gear 252, thereby effecting rotation of drive sprocket 242 and output sprocket 234 to impart reciprocating motion to the tool member 224 and the tool 220 attached thereto. As a result of the relative diameters of the sprockets 234, 242, the output sprocket 234 rotates at a lower angular velocity than does the engine shaft 258 thereby allowing the engine to operate at its most efficient speed while simultaneously effecting reciprocation of the vibratory clamp means at a desired rate.

Thus there has been disclosed a portable power driven implement capable of use with a variety of reciprocating tools and a selection of different power sources in which the various components are readily accessible, and are arranged in a compact configuration to minimize space requirements and thereby reduce the size of the implement.

From the foregoing, it will be observed that numerous variations and modifications may be effected without departing from the true spirit and scope of the novel concept of the invention. It is, of course, intended to cover by the appended claims all such modifications as fall within the scope of the claims.

I claim

1. A portable power driven implement comprising:
    housing means;
    a tool member slidably supported by said housing means for reciprocating motion relative thereto, said tool member having an inner end;
    motor means;
    drive means adapted to be rotated by said motor means;
    the axis of said drive means and the inner end of said tool member defining a plane passing therethrough;
    output means rotatably driven by said drive means;
    means linking said tool member and said output means for imparting reciprocating motion to said tool member in response to rotation of said output means, said linking means including:
    one end portion connected to the inner end of said tool member;
    another end portion connected to said output means traversing and intersecting said plane during rotation of said output means; and
    an intermediate portion spanning said drive means and configured to remain substantially on one side of said plane.

2. A portable power driven implement as claimed in claim 1 wherein:
    said drive means includes drive shaft means; and drive member means affixed to an end portion of said shaft means for rotatably driving said output means;
    said linking means spanning said drive shaft means between said drive member means and said motor means.

3. A portable power driven implement as claimed in claim 2 wherein:
    said intermediate portion of said linking means comprises an arcuate leg member interconnecting said end portions and disposed on one side of said plane; the configuration of said arcuate leg member maintaining a substantial portion thereof on one side of said plane by an amount sufficient to preclude engagement with said drive means during rotation of said output means.

4. A portable power driven implement as claimed in claim 3 wherein:
    said output means includes rotatable output shaft means; and
    an output member affixed to said output shaft means;
    said one end portion of said linking means being pivotally connected to the inner end of said tool member; and
    the other end portion of said linking means being pivotally connected to said output member at an eccentric position relative to said output shaft means.

5. A portable power driven implement as claimed in claim 4 wherein:
    said output shaft means is disposed parallel to the axis of said drive means and in said plane.

6. A portable power driven implement as claimed in claim 3 wherein:
    said drive member means comprises drive gear means drivingly connected to said output means for effecting rotation thereof at an angular velocity less than that of said drive shaft means.

7. A portable power driven implement as claimed in claim 6 including:
    flexible means interconnecting said drive gear means and said output means for rotatably driving said output means in response to rotation of said drive gear means.

8. A portable power driven implement as claimed in claim 6 wherein:
    said drive shaft means includes:
    intermediate drive shaft means; and primary drive shaft means rotated directly by said motor means;
    said drive gear means being affixed to said intermediate drive shaft means; and
    centrifugal clutch means having a portion affixed to said primary drive shaft means and operable to drivingly connect said primary drive shaft means to said intermediate drive shaft means to effect rotation thereof in response to said primary drive shaft means attaining a preselected angular velocity.

9. A portable power driven implement as claimed in claim 8 wherein:
    said drive gear means comprises first and second drive gear members affixed to said intermediate drive shaft means and rotatable therewith, said first intermediate gear member being operatively connected with said centrifugal clutch means; and
    flexible means interconnecting said second intermediate gear member to said output means for rotating said output means in response to operation of said clutch means.

10. A portable power driven implement as claimed in claim 9 wherein:
    said second drive gear member comprises a drive sprocket wheel;
    said output means comprises an output sprocket wheel having an axis of rotation parallel to said intermediate drive shaft means; and
    a drive chain engageable with said sprocket wheels for driving said output sprocket wheel in response to rotation of said drive sprocket wheel;
    said output sprocket wheel having a larger diameter than said drive sprocket wheel, whereby said output sprocket wheel is rotated at an angular velocity less than the angular velocity of said drive sprocket wheel.

11. A portable power driven implement as claimed in claim 10 wherein:
    said motor means is a light weight internal combustion engine situated in said housing and provided with said primary drive shaft means.

12. A portable power driven implement as claimed in claim 11 wherein:
    said link member forms part of spring-biased vibratory clamp means adapted for use as a harvesting implement.

13. A portable power driven implement as claimed in claim 6 wherein:
    said output means include rotatable shaft means and output gear means affixed to said output shaft means;
    said one end portion of said linking means being pivotally connected to the inner end of said tool member; and the other end portion of said linking means being pivotally connected to said output member at an eccentric position relative to said output shaft means.

14. A portable power driven implement as claimed in claim 13 wherein each of said drive gear means and said output gear means comprise sprocket means; and including
- a drive chain interconnecting said sprocket means for rotating said output sprocket means in response to rotation of said drive sprocket means;
- said output sprocket means having a larger diameter then said drive sprocket means, whereby said output sprocket means is rotated at an angular velocity less then the angular velocity of said drive sprocket means.

15. A portable power driven implement as claimed in claim 14 wherein:
- said motor means is an electrical motor situated in said housing means and provided with said drive shaft means.

16. A portable power driven implement as claimed in claim 15 wherein:
- said tool member forms part of a reciprocating tool.

17. A portable power driven implement as claimed in claim 15 wherein:
- said tool member forms part of a saw blade.

18. A portable chain driven implement as claimed in claim 15 wherein:
- said housing means includes a first housing portion in which said motor is disposed; and
- a second housing portion attached to said first housing portion;
- said drive shaft means extending between said housing portions.

19. A portable power driven implement as claimed in claim 2 wherein:
- said intermediate portion of said linking means defines a generally elongate opening through which extends at least a portion of said drive shaft means, the configuration of said intermediate portion precluding engagement thereof with said drive shaft means during rotation of said output means.

20. A portable power driven implement as claimed in claim 19 wherein:
- said intermediate portion of said linking means comprises a pair of arcuate leg members interconnecting said end portions and disposed on opposite sides of said plane to define said elongate opening therebetween, the configuration of said arcuate leg members maintaining substantial portions thereof on their respective sides of said plane.

21. A portable power driven implement as claimed in claim 20 wherein:
- said output means includes rotatable shaft means, and an output gear means affixed to said output shaft means; and
- said drive member means comprises drive gear means drivingly connected to said output gear means for effecting rotation thereof at an angular velocity less than that of said drive shaft means.

22. A portable power driven implement as claimed in claim 21 including:
- flexible means interconnecting said drive gear means and said output gear means for rotatably driving said output gear means in response to rotation of said drive gear means.

23. A portable power driven implement as claimed in claim 22 wherein:
- said drive gear means and said output gear means each comprising sprocket means; and said flexible means comprising a drive chain interconnecting said sprocket means.

* * * * *